(12) United States Patent
Watanabe et al.

(10) Patent No.: US 8,225,483 B2
(45) Date of Patent: Jul. 24, 2012

(54) METHOD OF MANUFACTURING A TORQUE SENSOR

(75) Inventors: Katsuji Watanabe, Saitama (JP); Yasuo Shimizu, Saitama (JP); Atsuhiko Yoneda, Saitama (JP); Tsunehiko Fukatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/511,198

(22) Filed: Jul. 29, 2009

(65) Prior Publication Data

US 2009/0288288 A1    Nov. 26, 2009

Related U.S. Application Data

(62) Division of application No. 11/723,752, filed on Mar. 21, 2007, now Pat. No. 7,624,653.

(30) Foreign Application Priority Data

Mar. 28, 2006 (JP) .................................. 2006-087468
Feb. 1, 2007 (JP) .................................. 2007-022704

(51) Int. Cl.
*G01R 3/00* (2006.01)

(52) U.S. Cl. ............. 29/595; 29/605; 29/606; 29/856; 29/858; 29/883; 73/862.331; 73/865.5; 264/272.11; 264/434

(58) Field of Classification Search ............... 29/595, 29/605, 606, 856, 858, 883; 264/272.11, 264/434; 361/283, 301; 73/862.331, 865.5
See application file for complete search history.

(56) References Cited

U.S. PATENT DOCUMENTS

| 5,526,704 | A | 6/1996 | Hoshina et al. |
| 6,412,356 | B1 | 7/2002 | Kouketsu et al. |
| 6,713,882 | B2 | 3/2004 | Yasuda |
| 6,804,876 | B1 * | 10/2004 | Ito et al. ................. 29/602.1 |
| 2004/0099064 | A1 | 5/2004 | Viola et al. |

FOREIGN PATENT DOCUMENTS

| DE | 197 02 519 A1 | 7/1997 |
| JP | 1-126540 | 8/1989 |
| JP | 05-004254 | 1/1993 |
| JP | 6-78833 | 11/1994 |
| JP | 7-83769 | 3/1995 |
| JP | 07 333081 A | 12/1995 |
| JP | 10 267770 A | 10/1998 |
| JP | 2003-004555 A | 1/2003 |
| JP | 2003-100783 | 4/2003 |
| JP | 2004-239652 A | 8/2004 |
| JP | 2005-156468 A | 6/2005 |

\* cited by examiner

*Primary Examiner* — Paul D Kim
(74) *Attorney, Agent, or Firm* — Arent Fox LLP (57) ABSTRACT

The torque sensor includes a plurality of coil units having a substantially cylindrical shape, the coil units including a plurality of detection coils arranged to face a magnetic characteristic change portion formed on a rotary shaft. The coil units include a first coil unit and a second coil unit, and the first coil unit and the second coil unit are disposed in the axial direction of the shaft. The first coil unit and the second coil unit are fixed in an integrally molded resin. Thereby, there is provided a torque sensor having a high productivity and an easy configuration and a method of manufacturing the torque sensor.

4 Claims, 8 Drawing Sheets

METHOD OF MANUFACTURING A TORQUE SENSOR

CROSS-REFERENCE TO RELATED APPLICATION(S)

This application is a divisional application of U.S. patent application Ser. No. 11/723,752, filed Mar. 21, 2007, now U.S. Pat. No. 7,624,653, which claims the foreign priority benefit under Title 35, United States Code, §119 (a)-(d), of Japanese Patent Applications No. 2006-87468 filed on Mar. 28, 2006 and No. 2007-22704 filed Feb. 1, 2007 in the Japan Patent Office, the disclosures of which are herein incorporated by reference in their entirety.

BACKGROUND OF THE INVENTION

1. Field of the Invention

The present invention relates to a torque sensor and a method of manufacturing the same, and particularly to a torque sensor that is mounted in an electric power steering apparatus of a vehicle or the like, and is used as a detection device to magnetically detect steering torque applied to a shaft through a steering shaft, and a method of manufacturing the torque sensor.

2. Description of the Related Art

In an electric power steering apparatus mounted in a vehicle, generally a torque sensor detects steering torque applied to a shaft through a steering shaft by a steering operation of a driver. In the electric power steering apparatus, a motor is driven to provide assist force (to apply assist steering force) for a steering operation of a driver in response to a detection signal from the torque sensor, so that steering force required by a driver is reduced and a comfortable steering feeling is provided for the driver.

As an example of a torque sensor mounted in such an electric power steering apparatus, there has been known a magnetostrictive torque sensor, which is disclosed, for example, in Japanese Laid-open Patent Application No. 2004-239652 (paragraph [0024~0034], FIGS. 1, 7~9).

In the magnetostrictive torque sensor, a magnetostrictive film (for example, a Ni—Fe alloy film) having magnetic anisotropy is attached on the surface of a shaft. When torque is applied to the shaft from outside, the magnetostrictive torque sensor magnetically detects changes of a magnetic characteristic (magnetic permeability) of the magnetostrictive film, which is generated in accordance with a twisting of the shaft, without contacting the magnetostrictive film.

A description will be given on the conventional magnetostrictive torque sensor by taking as an example a magnetostrictive torque sensor mounted in an electric power steering apparatus of a vehicle.

Figure 9:
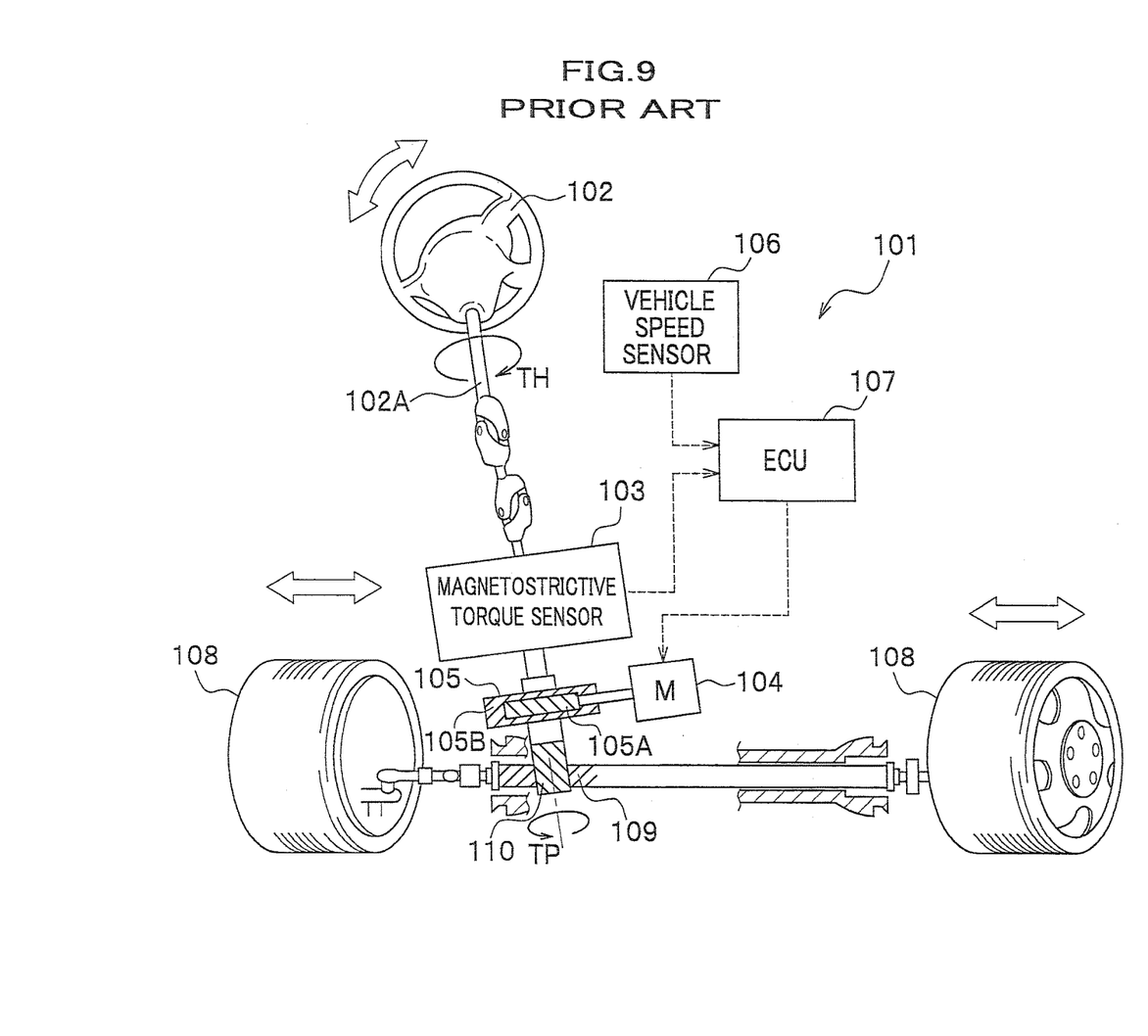
FIG. 9 schematically illustrates a conventional electric power steering apparatus.

FIG. 9 schematically illustrates the conventional electric power steering apparatus including the torque sensor.

As shown in FIG. 9, an electric power steering apparatus 101 mainly includes a torque sensor 103 that detects steering torque applied from a steering wheel 102, a motor 104 that applies assist steering force for an operation of the steering wheel 102, a reduction gear 105 that increases rotational torque generated by the motor 104, an electrical control unit (ECU) 107 that drives the motor 104 in response to a detection signal from the torque sensor 103 or a vehicle speed sensor 106, a rack shaft 109 and a pinion gear 110 that transmit rotation of the motor 104 to wheels 108, 108, and change a direction of the wheels 108, 108. The reduction gear 105 includes a worm 105A and a worm wheel 105B.

In the electric power steering apparatus 101 configured as above, steering torque applied by a steering operation of a driver is detected by the torque sensor 103, and the motor 104 is driven by the ECU 107 in response to a detection signal (torque signal) from the torque sensor 103, a detection signal (vehicle speed signal) from the vehicle speed sensor 106, or the like. Rotational torque generated by the motor 104 is increased by the reduction gear 105, and then is transmitted to the wheels 108, 108 through the pinion gear 110 and the rack shaft 109.

In the electric power steering apparatus 101, assuming that steering torque applied by a steering operation is TH, rotational torque transmitted to the pinion gear 110 is TP, and a constant that associates with an amount of assist torque generated by the motor 104 is KA, thereby obtaining the equation TH=TP/(1+KA). Therefore, it is possible to reduce steering force required by a driver by using the assist torque generated by the motor 104.

Next, a description will be given on the torque sensor 103 with reference to FIG. 10.

Figure 10:
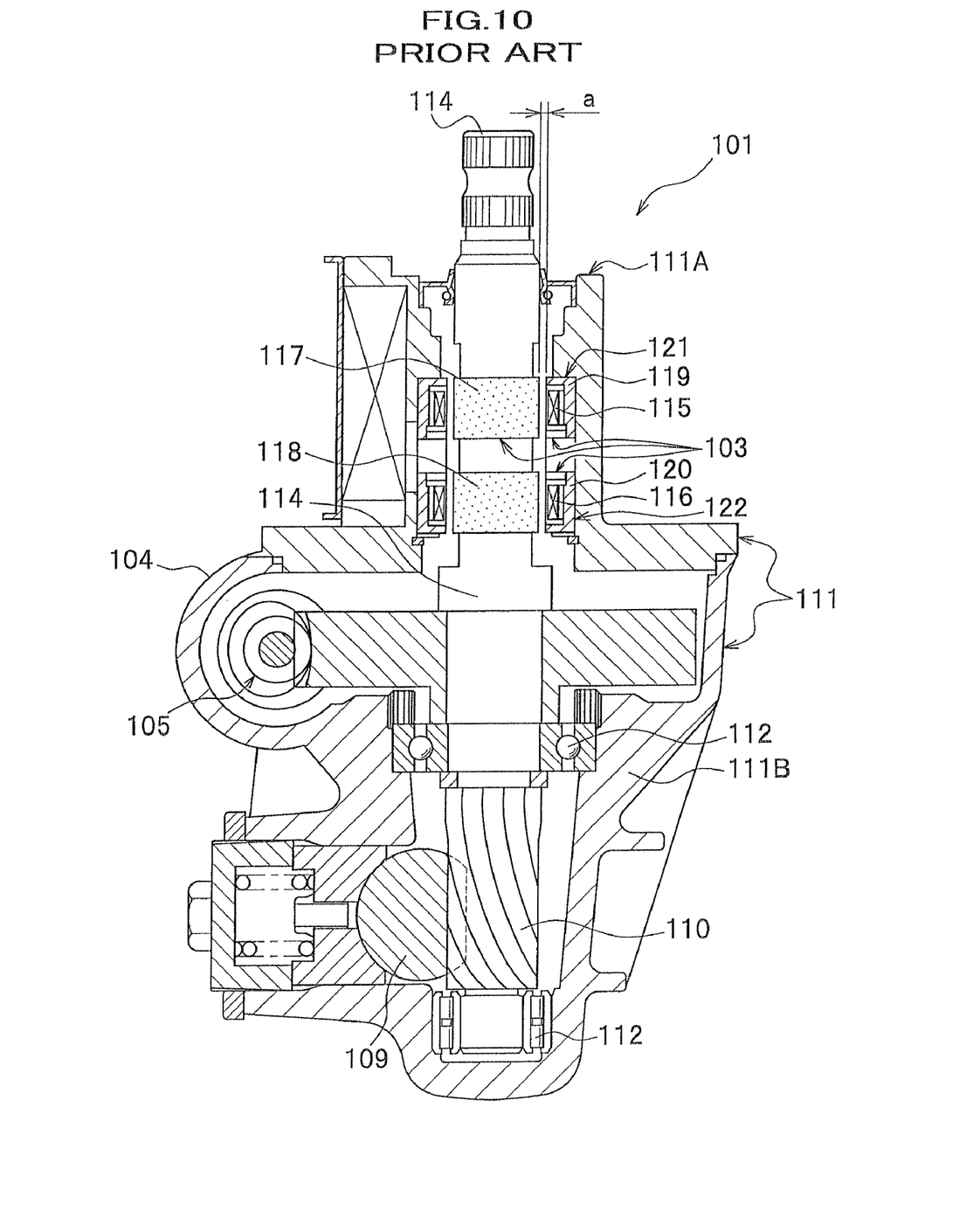
FIG. 10 is a sectional view of a main part of a conventional electric power steering apparatus wherein a magnetostrictive torque sensor is mounted.

FIG. 10 is a sectional view of a main part of a conventional electric power steering apparatus where a magnetostrictive torque sensor is mounted.

As shown in FIG. 10, the torque sensor 103 is contained in a sensor housing 111 that includes an upper housing 111A and a lower housing 111B. The torque sensor 103 mainly includes a shaft 114 that is connected to a steering shaft 102A (see FIG. 9) of the steering wheel 102 (see FIG. 9) and is rotatably supported in the sensor housing 111 via a shaft bearing 112 or the like, coil units 121, 122 having coils (detection units) 115, 116 that are disposed separately in the axial direction on the inner periphery side of the upper housing 111A, and magnetostrictive films 117, 118 that are formed on the outer periphery side (outer surface) of the shaft 114 so as to face the coils 115, 116 and that have magnetic anisotropy in opposite directions to each other.

When steering torque is applied to the shaft 114 from the steering wheel 102 (see FIG. 9), each of the coils 115, 116 electrically detects changes of a magnetic characteristic of the magnetostrictive films 117, 118 in accordance with a twisting of the shaft 114, and based on the detection result, a direction and an amount of steering torque applied to the shaft 114 are detected.

The upper housing 111A is made of a light alloy, such as an aluminum alloy or a magnesium alloy. Yokes 119, 120 of the coil units 121, 122 are made of a magnetic steel sheet or the like, which has a high magnetic characteristic and a soft magnetic property. The shaft (steering shaft) 114 is made of an iron alloy such as a SC or SCM material, and on the outer periphery side of the shaft 114 are formed the magnetostrictive films 117, 118 of Fe—Ni or Fe—Cr by plating, vapor deposition, or the like.

In the torque sensor 103 disclosed in the above publication, however, the upper housing 111A of the sensor housing 111, the yokes 119, 120, and the shaft 114, which are shown in FIG. 10, are made of different metallic materials, thereby having a different coefficient of linear expansion.

Compared to an iron alloy of the magnetostrictive films 117, 118 and the shaft 114 and a magnetic steel sheet of the yokes 119, 120, an aluminum alloy of the sensor housing 111 has approximately twice the coefficient of linear expansion as an iron alloy and a magnetic steel sheet.

The electric power steering apparatus 101 of a vehicle is used in an environment at a temperature of −40° C. to 80° C., and can be used at a more severe temperature.

At a high temperature, a gap grows between the sensor housing 111 and the yokes 119, 120 due to an expansion of the sensor housing 111 relative to the yokes 119, 120.

In the torque sensor 103, the amount of pressure between the yokes 119, 120 and the sensor housing 111 decreases due to the gap, thereby causing backlash between the yokes 119, 120 and the sensor housing 111. As a result, in the torque sensor 103, a gap "a" between the yokes 119, 120 and the magnetostrictive films 117, 118 changes, and the change of the gap "a" varies a magnetic path, thereby changing an output from the torque sensor 103. For this reason, detection accuracy of the torque sensor 103 is deteriorated. Further, an output from the torque sensor 103 varies because the shaft 114 is offset in the axial direction, that is, the coils 115, 116 slides relative to the position of the magnetostrictive films 117, 118 in the axial direction. For this reason, in the torque sensor 103, a holding portion of the coil units 115, 116 must be processed with high dimensional accuracy.

In order to reduce the backlash between the yokes 119, 120 and the sensor housing 111, the torque sensor 103 will have increase in the number of components and man-hours for assembling, and the complexity of the configuration.

SUMMARY OF THE INVENTION

Therefore, an object of the present invention is to provide a torque sensor having a high productivity and an easy configuration and a method of manufacturing the torque sensor.

According to the first aspect of the present invention, there is provided a torque sensor comprising: a magnetic characteristic change portion formed on a rotary shaft; and a plurality of coil units having a substantially cylindrical shape, the plurality of coil units including first and second coil units, each including a detection coil arranged to face the magnetic characteristic change portion, the first and the second coil units arranged in an axial direction of the shaft. In the torque sensor, the first coil unit and the second coil unit are fixed in an integrally molded resin.

In the torque sensor according to the first aspect of the present invention, the first coil unit and the second coil unit are fixed in an integrally molded resin (insert molding) so that the molded resin member, the first coil unit, and the second coil unit can be maintained at a certain distance from each other, thereby making it possible to stabilize an output of the torque sensor and the detection accuracy thereof.

Because the first coil unit and the second coil unit are fixed in an integrally molded resin, there is no need to control processing accuracy in order to improve dimensional accuracy between the respective members, thereby improving productivity of the torque sensor.

Because the molded resin shrinks after molding, the coil units disposed inside the molded resin member are maintained with pressure in the axial and diametrical direction. For this reason, there is no need to provide a spring member to prevent backlash between the members due to changes of a temperature. As a result, it is possible to improve detection accuracy, reduce the number of components and man-hours for assembling, simplify the configuration, and improve mass productivity.

According to the second aspect of the present invention, there is provided the torque sensor further comprising a spacer interposed between the first coil unit and the second coil unit.

In the torque sensor according to the second aspect of the present invention, the first coil unit, the second coil unit, and the spacer, which is interposed between the first and second coil units, are fixed in an integrally molded resin so that the molded resin member, the first and second coil units, and the spacer are maintained at a certain distance from each other, thereby making it possible to stabilize an output of the torque sensor and the detection accuracy thereof.

Because the first coil unit, the second coil unit, and the spacer are fixed in an integrally molded resin, there is no need to control processing accuracy in order to improve dimensional accuracy between the respective members, thereby improving productivity of the torque sensor.

According to the third aspect of the present invention, there is provided the torque sensor wherein the first coil unit, the second coil unit, and the spacer are fixed in a housing integrally molded with resin.

In the torque sensor according to the third aspect of the present invention, the first coil unit, the second coil unit, and the spacer are maintained in one housing, thereby making it possible to reduce the number of components and man-hours for assembling.

According to the fourth aspect of the present invention, there is provided the torque sensor wherein the spacer includes a bearing having a smaller inner diameter than inner diameters of the first coil unit and the second coil unit.

In the torque sensor according to the fourth aspect of the present invention, because the spacer includes a bearing having a smaller inner diameter than those of the first coil unit and the second coil unit, a certain distance can be maintained between the shaft and the first and second coil units, thereby improving detection accuracy of the torque sensor.

According to the fifth aspect of the present invention, the torque sensor is employed in an electric power steering apparatus that steers a vehicle by driving a motor in accordance with steering torque.

In the torque sensor according to the fifth aspect of the present invention, the torque sensor is employed in an electric power steering apparatus as a sensor dedicated for detection of steering torque, and therefore the torque sensor is not affected by backlash between the members due to heat expansion even in a severe environment at a high temperature, thereby obtaining the electric power steering apparatus capable of giving a comfortable steering feeling.

According to the sixth aspect of the present invention, there is provided the torque sensor further comprising a yoke disposed on an outer circumference of each of the plurality of detection coils.

In the torque sensor according to the sixth aspect of the present invention, the yoke is disposed on the outer circumference of each of the plurality of detection coils, so that magnetic permeability can be improved and detection accuracy of the torque sensor can be increased.

According to the seventh aspect of the present invention, there is provided the torque sensor further comprising a spacer disposed under the second coil unit in the axial direction of the shaft.

In the torque sensor according to the seventh aspect of the present invention, a spacer is disposed under the second coil unit in the axial direction of the shaft, thereby making it possible to maintain a certain distance between respective members. Therefore, it is possible to stabilize an output of the torque sensor and the detection accuracy thereof.

Because the first coil unit, the second coil unit, and the spacer are fixed in an integrally molded resin, there is no need to control processing accuracy in order to improve dimensional accuracy between the respective members, thereby improving productivity of the torque sensor.

According to the eighth aspect of the present invention, there is provided the torque sensor wherein a yoke disposed in the second coil unit has a tapered surface at a lower end thereof, and the spacer is a ring-shaped member having a tilted surface to contact with the tapered surface.

In the torque sensor according to the eighth aspect of the present invention, a tapered surface is formed on a lower end of a yoke disposed in the second coil unit, and the spacer is a ring-shaped member having a tilted surface to contact with the tapered surface. Therefore, the tilted surface of the spacer and the tapered surface of the yoke contact with each other, thereby maintaining the respective members in the axial direction of the shaft. Therefore, it is possible to stabilize an output of the torque sensor and the detection accuracy thereof According to the ninth aspect of the present invention, there is provided a method of manufacturing a torque sensor comprising a magnetic characteristic change portion formed on a rotary shaft, a plurality of coil units having a substantially cylindrical shape, the plurality of coil units including first and second coil units, each including a detection coil arranged to face the magnetic characteristic change portion, the method using a centering rod and a die set including a base die and other dies. The method comprises the steps of: fitting internal members including the first coil unit, the second coil unit, and a spacer on the centering rod so as to dispose the internal members on the base die; setting the other dies on the base die; and molding a resin, in which the first coil unit, the second coil unit, and the spacer are fixed.

In the torque sensor according to the ninth aspect of the present invention, the first coil unit, the second coil unit, and the spacer are fixed in an integrally molded resin in the molding process so that the respective members can be integrally maintained and contained at once. Therefore, it is possible to reduce dimension errors between the components of the torque sensor, improve detection accuracy, and reduce the number of the components and man-hours for assembly.

According to the tenth aspect of the present invention, there is provided the method of manufacturing the torque sensor, wherein a yoke is disposed on an outer circumference of each of the plurality of detection coils.

In the method of manufacturing a torque sensor according to the tenth aspect of the present invention, magnetic permeability can be improved and detection accuracy of the torque sensor can be increased.

In the torque sensor and the method of manufacturing the torque sensor according to the present invention, it is possible to reduce the number of the components and man-hours for assembly, simplify the configuration of the torque sensor, and improve productivity.

BRIEF DESCRIPTION OF THE DRAWINGS

The object and features of the present invention will become more readily apparent from the following detailed description taken in conjunction with the accompanying drawings in which.

DETAILED DESCRIPTION OF THE INVENTION

A description will be given on an example of a torque sensor 1 and a method of manufacturing the torque sensor 1 according to an embodiment of the present invention with reference to FIGS. 1 to 3.

The torque sensor 1 according to an embodiment of the present invention detects rotational torque of a shaft 4, which is caused by rotational force acting on the shaft 4. As an example of a torque sensor according to an embodiment of the present invention, a description will be given on a torque sensor 1 mounted on an electric power steering apparatus 11 to detect steering torque.

Prior to a description of the torque sensor 1 and a method of manufacturing the torque sensor 1, a description will be given on an electric power steering apparatus 11 of a vehicle, on which the torque sensor 1 is mounted.

A direction relative to the torque sensor 1 changes from right to left or up and down depending on the direction, in which the torque sensor 1 is placed, and therefore in the description the upper side of the drawings is defined to be the upward direction.

Figure 1:
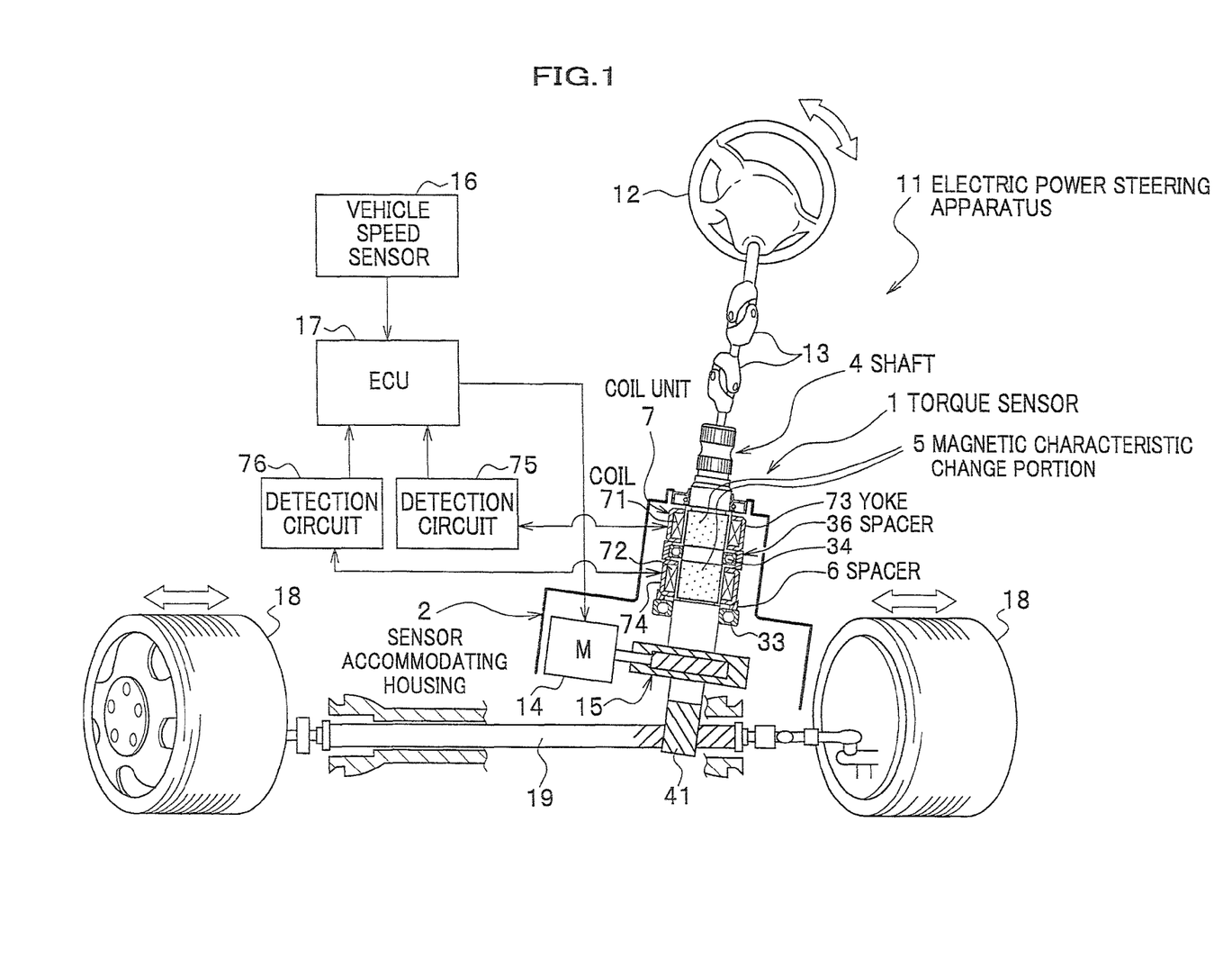
FIG. 1 illustrates an electric power steering apparatus including a torque sensor according to an embodiment of the present invention.

FIG. 1 schematically illustrates an electric power steering apparatus including a torque sensor according to an embodiment of the present invention.

<<Configuration of the Electric Power Steering Apparatus>>

As shown in FIG. 1, the electric power steering apparatus 11 has the almost same configuration as that of the electric power steering apparatus 101 including the torque sensor 103, which is above mentioned with reference to FIGS. 9 and 10, except for a configuration of the torque sensor 1.

Specifically, the electric power steering apparatus 11 shown in FIG. 1 mainly includes the torque sensor 1 that detects steering torque applied from a steering wheel 12 by a driver, a motor 14 that applies assist steering force to a driver's steering, a reduction gear 15 that increases rotational torque generated by the motor 14, an electrical control unit (ECU) 17 that controls the motor 14 in response to a detection signal from the torque sensor 1 or a vehicle speed sensor 16, a rack shaft 19 and a pinion gear 41 that transmit rotation of the motor 14 to wheels 18, 18 and change a direction of the wheels 18, 18.

<<Configuration of the Torque Sensor>>

Figure 2:
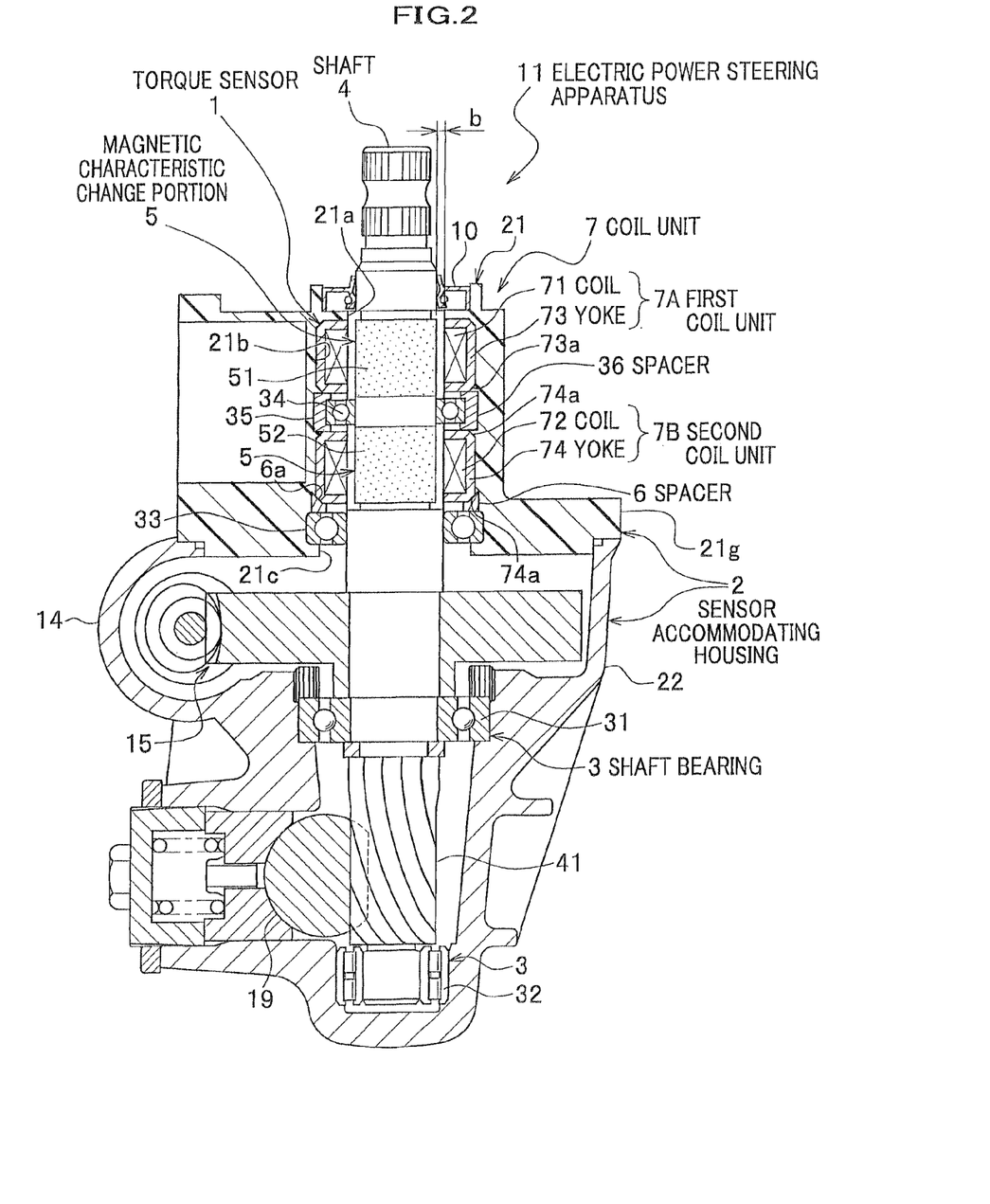
FIG. 2 is a schematic sectional view of a main part of an electric power steering apparatus where a torque sensor according to an embodiment of the present invention is disposed.

FIG. 2 is a schematic sectional view of a main part of the electric power steering apparatus 11 where the torque sensor 1 according to an embodiment of the present invention is mounted.

As shown in FIG. 2, the torque sensor 1 includes a plurality of coil units 7 having an substantially cylindrical shape, the coil units 7 including a plurality of coils (detection coil) 71, 72 arranged to face a magnetic characteristic change portion 5 (magnetostrictive films 51, 52) formed on the rotary shaft 4, and yokes 73, 74 disposed on the outer circumference of the coils 71, 72.

Hereinafter, an embodiment of the present invention will be described with the torque sensor 1 including the magnetostrictive films 51, 52 and the coil units 7 (a first coil unit 7A and a second coil unit 7B).

When steering torque is applied to the shaft 4 from the steering wheel 12 (see FIG. 1), the torque sensor 1 electrically detects changes of a magnetic characteristic of the magnetostrictive films 51, 52, which are generated in accordance with a twisting of the shaft 4, by using the coils 71, 72 or the like, thereby detecting a direction and an amount of the steering torque applied to the shaft 4.

The torque sensor 1 includes the first coil unit 7A and the second coil unit 7B, and the first coil unit 7A and the second coil unit 7B are disposed in the axial direction of the shaft 4 together with spacers 6, 36. The first coil unit 7A, the second coil unit 7B, and the spacers 6, 36, which maintain a certain distance between the respective members, are fixed and housed integrally in a sensor housing 2 that is molded with resin.

<Configuration of the Shaft>

As shown in FIG. 1, the shaft 4 is a steering shaft that is coupled to the steering wheel 12 via universal joints 13, 13 and turns together with the steering wheel 12. As shown in FIG. 2, the shaft 4 is integrally formed with the pinion gear 41 on a lower end portion thereof, and is rotatably accommodated in the sensor housing 2 via a shaft bearing 3 in the vertical direction. The magnetostrictive films 51, 52 of the magnetic characteristic change portion 5 are formed on two parts of the outer circumference side of the shaft 4 so as to face the coils 71, 72. An upper end portion of the shaft 4 protrudes from the sensor housing 2 through a shaft opening 21a of an upper housing 21 and a ring-shaped sealing member 10.

The shaft 4 is made of, for example, chrome molybdenum steel such as SCM822. The chrome molybdenum steel of the shaft 4 is subjected to heat treatment such as quenching in advance, and then the magnetostrictive films 51, 52 are attached on the shaft 4 by a physical vapor deposition (PVD) method such as spattering or ion plating, a plating method, a plasma spraying method or the like. The hardness of the shaft 4 is set to be in the range of HRC 40-65 of Rockwell hardness.

<Configuration of the Magnetic Characteristic Change Portion>

On the magnetic characteristic change portion 5, a magnetic characteristic (magnetic permeability) of the magnetostrictive films 51, 52 changes according to distortion of the shaft 4, the distortion generated when steering torque is applied to the shaft 4. The magnetic characteristic change portion 5 includes the magnetostrictive films 51, 52 that are vertically arranged with a predetermined space interposed therebetween on the outer circumference side (outward surface) of the shaft 4 in the axial direction.

For example, a magnetostrictive member made of a Fe—Ni or Fe—Cr alloy film or the like is integrally fixed on the shaft 4 by plating or vapor deposition so as to form the magnetostrictive films 51, 52. The magnetostrictive films 51, 52 include magnetostrictive members that have magnetic anisotropy in opposite directions to each other.

<Configuration of the Coil Unit>

The coil unit 7 electrically detects changes of a magnetic characteristic of the magnetostrictive films 51, 52, thereby detecting steering torque applied to the shaft 4. The coil unit 7 includes the first coil unit 7A and the second coil unit 7B. The first coil unit 7A, the second coil unit 7B, and the spacer 36, which maintains a certain distance between the first coil unit 7A and the second coil unit 7B, are fixed in the upper housing 21 that is molded with resin.

<Configuration of the First Coil Unit and the Second Coil Unit>

The first coil unit 7A and the second coil unit 7B include the coils 71, 72 and the yokes 73, 74, which are disposed in the periphery of the coils 71, 72 to hold the coils 71, 72, respectively. The first coil unit 7A and the second coil unit 7B are arranged to face the magnetic characteristic change portion 5 with a predetermined distance interposed therebetween. The first coil unit 7A and the second coil unit 7B are detection units to detect steering torque applied to the shaft 4 by detecting changes of a magnetic characteristic of the magnetic characteristic change portion 5.

As shown in FIG. 1, the first coil unit 7A and the second coil unit 7B are electrically connected to the ECU 17 via detection circuits 75, 76, which detect a torque detection voltage outputted from the coils 71, 72 in accordance with changes of a magnetic characteristic when electricity is alternately applied to the coils 71, 72.

<Configuration of the Coil>

The coils 71, 72 are composed of magnetizing coil dedicated for detection. As shown in FIG. 2, the coils 71, 72 are electrically conducted to the magnetostrictive films 51, 52 and detect changes of a magnetic characteristic (magnetic permeability) of the magnetostrictive film 51, 52 when steering torque is applied to the shaft 4. The coils 71, 72 are separately disposed in the axial direction on the inner circumference side of the upper housing 21. The coils 71, 72 wound around bobbins (not shown) are disposed inside the yokes 73, 74, respectively, and arranged to face the magnetostrictive films 51, 52 with a predetermined space b interposed therebetween.

<Configuration of the Yoke>

As shown in FIG. 2, the yokes 73, 74 form outer frames of the coils 71, 72, and are, for example, ring-shaped members having an substantially transverse U-shape in a sectional view. The yokes 73, 74 are made of a steel sheet or the like that has a soft magnetic property. On the outer circumference end of the top and bottom sides of the yokes 73, 74 are respectively provided tapered surfaces 73a, 74a, which are cut off at approximately 45°. The spacer 36, which includes a bearing 34 (shaft bearing 3) held by a ring-shaped holing member 35, is interposed between the yokes 73, 74 in the axial direction of the shaft 4 so that the spacer 36 maintains a certain distance between the yokes 73, 74.

The upper yoke 73, the ring-shaped holding member 35, the lower yoke 74, the spacer 6, and the bearing 33 are disposed in series in the sensor accommodating portion 21b, which is molded with resin, through the opening portion 21c in the axial direction, The tapered surface 74a provided on the lower end of the lower yoke 74 contacts with a tilted surface 6a of the spacer 6. Thereby, the yokes 73, 74 are contained in the sensor housing 2.

An angle of the tapered surface 73a, 74a, and the tilted surface 6a of the spacer 6, which will be described later in detail, is not limited to 45°, but may be changed to 30° or 60° if required.

<Configuration of the Shaft Bearing (Spacer)>

As shown in FIG. 2, the shaft bearing 3 is a member for rotatably supporting the shaft 4, and, for example, includes a plurality of bearings 31, 32, 33, and 34. The bearings 31, 32 include a ball bearing or a roller bearing, and are attached in the lower housing 22 so as to support the lower end portion of the shaft 4 and the shaft 4 on the upper side of the pinion gear 41.

The bearings 33, 34 include, for example, a ball bearing. The bearings 33, 34 are attached on the shaft 4 and are disposed inside the sensor accommodating portion 21b of the upper housing 21. The bearing 34 and the ring-shaped holding member 35 form the spacer 36 that maintains a certain distance between the first coil unit 7A and the second coil unit 7B, and also function as a shaft bearing of the shaft 4. Similarly to the spacer 36, the bearing 33 and the spacer 6, which will be described later, have a function to maintain a certain distance between the members.

The bearing 33, which is attached on the lower end portion of the sensor accommodating portion 21b, contacts with the bottom surface of the spacer 6. The inner circumference of the bearing 33 is attached on the shaft 4 and the outer circumference thereof is fixed in the upper housing 21 that is molded with resin.

The bearing 34, which is arranged in a middle portion of the sensor accommodating portion 21b, is attached inside the ring-shaped holding member 35, and is made smaller than the bearing 33 disposed in the lower end portion of the sensor accommodating portion 21b. The inner circumference of the bearing 34 is attached on the shaft 4 and the outer circumference thereof is fixed on the ring-shaped holding member 35. An inner diameter of the inner circumference of the bearing 34 is made smaller than those of the first coil unit 7A and the second coil unit 7B so that the bearing 34 maintains a certain space b between the coil unit 7 and the magnetic characteristic change portion 5.

The top surface of the ring-shaped holding member 35 contacts with the bottom surface of the upper yoke 73 and the bottom surface of the holding member 35 contacts with the top surface of the lower yoke 74 so that the holding member 35 is fixed in the upper housing 21 that is molded with resin.

<Configuration of the Spacer>

As shown in FIG. 2, the spacer 6 and the bearing 33 have a function to keep the second coil unit 7B at a certain height. The spacer 6 is a ring-shaped member made of metal, and on the outer circumference portion thereof, is provided with a tilted surface 6a that tilts towards the axis of the shaft 4 and has an substantially rectangular triangle shape in a sectional view. The spacer 6 is interposed between the lower yoke 74 and the bearing 33, and the tilted surface 6a formed on the outer circumference portion contacts with the tapered surface 74a of the lower yoke 74 all the time. Thereby, the spacer 6 is disposed in the sensor accommodating portion 21b.

The spacer 6 is contained in the sensor accommodating portion 21b with the tilted surface 6a of the spacer 6 in contact with the tapered surface 74a of the yoke 74, so that the yokes 73, 74, the ring-shaped holding member 35, and the bearing 33, which are arranged in the sensor accommodating portion 21b, are pressed in the axial direction and therefore the adjacent members are pressed to each other.

<Configuration of the Sensor Housing>

The sensor housing 2 houses the torque sensor 1 or the like, and includes the upper housing 21, which is disposed on the upper side of the sensor housing 2, and the lower housing 22, which is fitted onto the lower side of the upper housing 21 and is tightened by bolting. In the sensor housing 2, at least the upper housing 21 is made of resin.

It should be noted that the upper housing 21, which forms the sensor housing 2, corresponds to "a housing" set forth in the appended claims.

The upper housing 21 is a housing that is molded with resin (so-called insert molding) and integrally formed with the first coil unit 7A, the second coil unit 7B, the bearings 33, 34, the ring-shaped holding member 35, and the spacer 6. The upper housing 21 includes the sensor accommodating portion 21b, the shaft opening 21a, through which the shaft 4 is inserted, and an opening portion 21c. The first coil unit 7A, the second coil unit 7B, the bearings 33, 34, the ring-shaped holding member 35, and the spacer 6 are fixed in the sensor accommodating portion 21b, and the adjacent members softly contact with one another. In the upper housing 21, the shaft opening 21a is provided with the sealing member 10 so that air tightness can be provided inside the sensor housing 2.

A material of the upper housing 21 includes, for example, a synthetic resin such as MC nylon (registered trademark), which is superior in mechanical strength, heat resistance, friction resistance, chemical resistance, and machining property.

The lower housing 22 houses the shaft bearing 3, the pinion gear 41, or the like. Other members such as the motor 14 (see FIG. 1), the reduction gear 15 (see FIG. 1), or the rack shaft 19 are contained in the lower housing 22. The lower housing 22 is made of resin for example, but may be made of metal.

<<Method of Manufacturing the Torque Sensor>>

With reference to FIGS. 3 to 6, a description will be given on a method of manufacturing the torque sensor 1 according to an embodiment of the present invention. The torque sensor 1 is manufactured by performing the molding with a synthetic resin such as MC nylon (registered trademark) in the manner as follows.

<Explanation of a Process of Disposing Internal Members>

Figure 3:
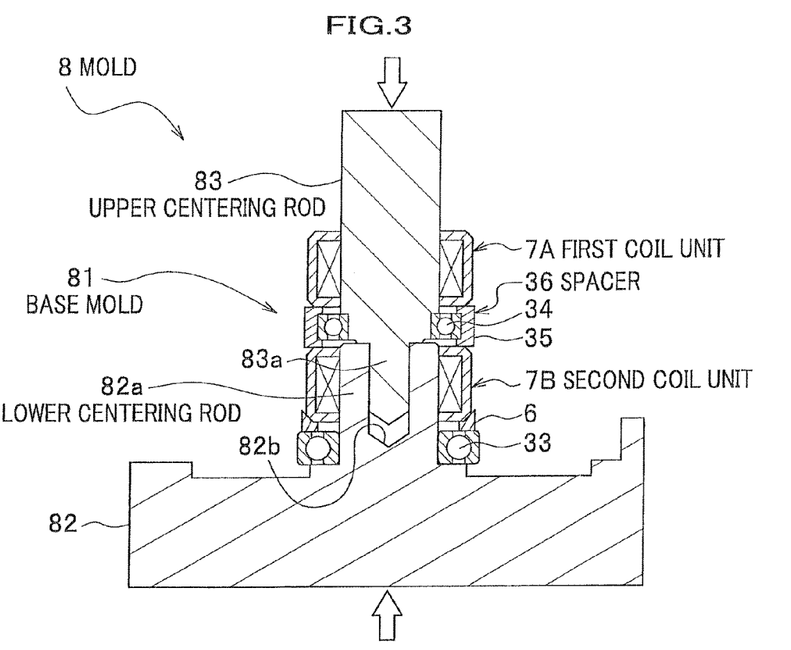
FIG. 3 illustrates a method of manufacturing a torque sensor according to an embodiment of the present invention, and explains a process of disposing internal members.

FIG. 3 illustrates a method of manufacturing a torque sensor according to an embodiment of the present invention, and explains a process of disposing internal members.

With reference to FIG. 3, a description will be given on a die 8 that is used in the process of disposing internal members. The internal members means members to be disposed inside the upper housing 21 (see FIG. 2) when molding the upper housing 21 in resin.

As shown in FIG. 3, a base die 81, which constitutes the die 8 for forming the torque sensor 1, is a die to form the lower side portion of the upper housing 21 (see FIG. 2), and includes a base 82 and an upper centering rod 83.

The base 82 has a lower centering rod 82a and a blind hole 82b. The bearing 33, the spacer 6, and the second coil unit 7B are fitted onto the lower centering rod 82a, which has a cylindrical shape, so that the lower centering rod 82a is supported by the members. The blind hole 82b is formed in the center of the upper end surface of the lower centering rod 82a, and is inserted with a protrusion 83a formed in the center of the lower end portion of the upper centering rod 83. The base 82 and the lower centering rod 82a are formed with high dimensional accuracy. The first coil unit 7A and the second coil unit 7B are held on the base die 81 with high accuracy by the lower centering rod 82a.

The bearing 34 attached inside the ring-shaped holding member 35 and the first coil unit 7A are fitted onto the upper centering rod 83 so that the upper centering rod 83 is supported by the members. The upper centering rod 83 is integrally formed with the protrusion 83a, which is designed to connect the centering rod 83 with the base 82, in the center of the lower end portion of the centering rod 83. An inner diameter of the upper centering rod 83 is made smaller than those of the first coil unit 7A and the second coil unit 7B, so that it is possible to pull out the upper centering rod 83 after molding. Therefore, the upper centering rod 83 and the stand 82 are formed separately.

It should be noted that the lower centering rod 82a and the upper centering rod 83 correspond to "a centering rod" set forth in the appended claims.

In the first process of disposing the internal members, the bearing 33, the spacer 6, the second coil unit 7B, the bearing 34 attached inside the ring-shaped holding member 35, and the first coil unit 7A, which are disposed inside the sensor housing 2, are fitted onto the lower centering rod 82a and the upper centering rod 83 (a centering rod) in series, so that the internal members are disposed on the base 82 of the base die 81.

<Explanation of a Process of Setting a Die>

Figure 4:
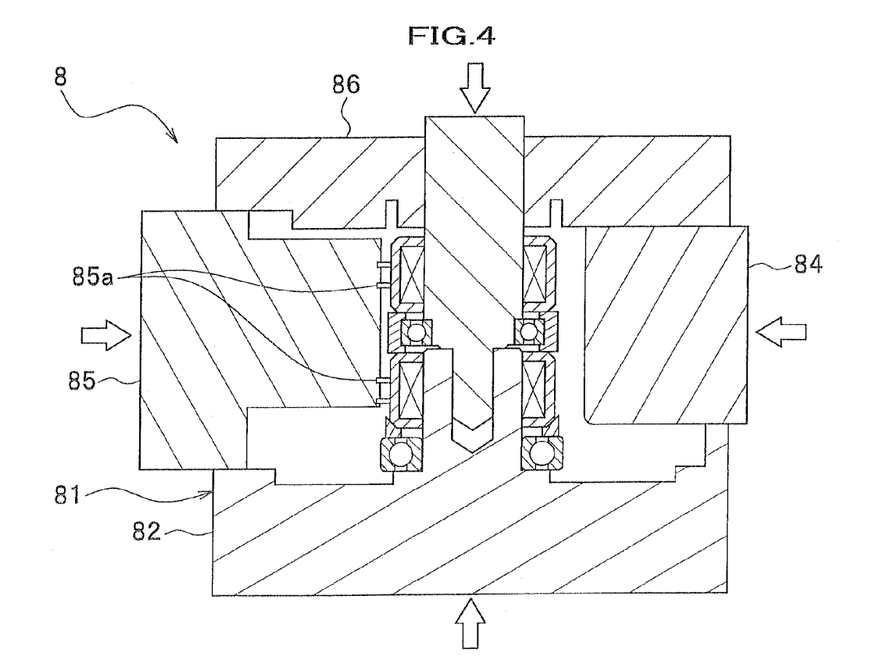
FIG. 4 illustrates a method of manufacturing a torque sensor according to an embodiment of the present invention, and explains a process of setting a die.

FIG. 4 illustrates a method of manufacturing a torque sensor according to an embodiment of the present invention, and explains a process of setting a die.

With reference to FIG. 4, a description will be given on the die 8 that is used in the die setting process.

As shown in FIG. 4, the die 8, which is arranged above the base die 81, includes a side portion die 84, a side portion die 85, and an upper portion die 86. The side portion die 84 is designed to form a side portion of the upper housing 21 (see FIG. 2). The side portion die 85 is designed to form a side portion of the upper housing 21 (see FIG. 2) and form openings 85a so as to provide interfaces in the upper housing 21. The upper portion die 86 is designed to form an upper portion of the upper housing 21.

In the second process of setting the die, the side portion dies 84, 85 and the upper portion die 86 are set on the base die 81. After setting the dies, the base die 81, the side portion dies 84, 85 and the upper portion die 86 are clamped together.

It should be noted that the side portion dies 84, 85 and the upper portion die 86 correspond to "other dies" set forth in the appended claims.

<Explanation of a Molding Process>

Figure 5:
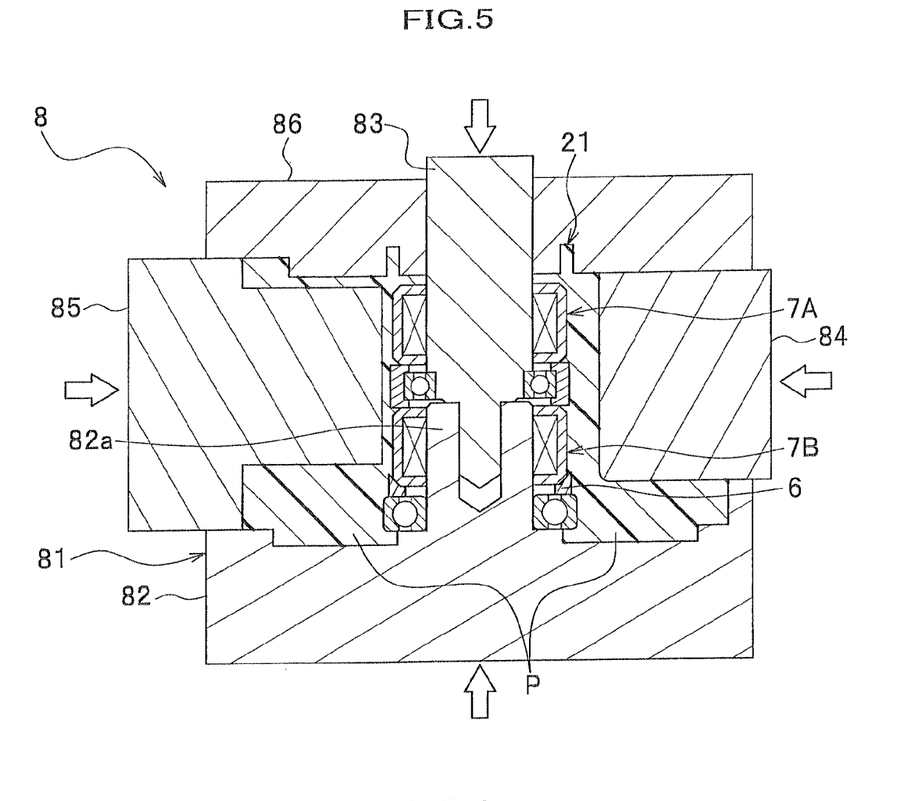
FIG. 5 illustrates a method of manufacturing a torque sensor according to an embodiment of the present invention, and explains a molding process.

FIG. 5 illustrates a method of manufacturing a torque sensor according to an embodiment of the present invention, and explains a molding process.

As shown in FIG. 5, an injection nozzle (not shown) injects a molten resin P through a port (not shown) so that the die 8 is filled with the molten resin P, thereby forming a housing including the first coil unit 7A, the second coil unit 7B, the spacer 6, or the like by resin molding.

Figure 6:
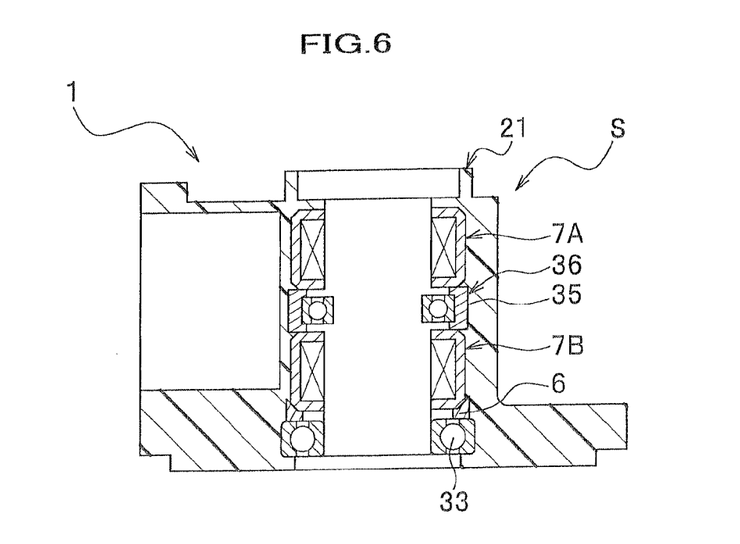
FIG. 6 illustrates a method of manufacturing a torque sensor according to an embodiment of the present invention, and explains the molded-in upper housing 21.

FIG. 6 illustrates a method of manufacturing a torque sensor according to an embodiment of the present invention, and explains the molded-in upper housing 21.

After the die 8 is cooled off, the upper portion die 86, the side portion dies 84, 85, the upper centering rod 83, and the base die 81 are removed to take out a product S. Then, the product S (upper housing 21) as shown in FIG. 6 is obtained.

According to the method of manufacturing the torque sensor 1, as shown in FIG. 5, the first coil unit 7A and the second coil unit 7B are supported with high accuracy by the lower centering rod 82a of the base die 81 and the upper centering rod 83, which are regarded as the shaft 4 (see FIG. 2), so as to form the product S (see FIG. 6). Furthermore, the product S (see FIG. 6) are formed with high accuracy relative to the base 82 of the base die 81, which are regarded as the upper housing 21.

As shown in FIG. 6, the above molded-in product S (torque sensor 1) is one component where the first coil unit 7A, the ring-shaped holding member 35, the second coil unit 7B, the spacer 6, the bearing 33, and the upper housing 21 are integrally fixed. Therefore, it is possible to reduce the number of components and man-hours for assembling, and to eliminate the control of dimensional accuracy of each of the members disposed inside the upper housing 21 in case of changes of a temperature.

As shown in FIG. 2, the upper housing 21 is fitted on the lower housing 22, on which the shaft 4 having the magnetostrictive films 51, 52 is mounted, and the housings 21, 22 are tightened by bolting, thereby obtaining the torque sensor 1.

Compared to a conventional torque sensor, in which an upper housing and a coil unit are separately formed, the torque sensor 1 configured as above need not control processing accuracy to improve dimensional accuracy, or need not be provided with a spring member to prevent backlash between the members, which is generated due to changes of a temperature. Therefore, it is possible to reduce the number of components, simplify the configuration and improve mass productivity.

<<Function of Torque Sensor>>

With reference to FIGS. 1 and 2, a description will be given on a function of the torque sensor 1.

In the electric power steering apparatus 11 as shown in FIG. 1, steering torque applied by a driver's steering operation is detected by the torque sensor 1, and the motor 14 is driven by the ECU 17 in response to a detection signal from the torque sensor 1, the vehicle speed sensor 16, or the like. The torque generated by the motor 14 is increased by the reduction gear 15, and then is transmitted to the wheels 18, 18 through the pinion gear 41 and the rack shaft 19.

As shown in FIG. 2, the tilted surface 6a of the spacer 6 and the tapered surface 74a of the second coil unit 7B contact with each other so that the torque sensor 1 is disposed inside the upper housing 21. In the molded-in torque sensor 1, the resin of which the upper housing 21 is formed shrinks after molding. Therefore, the first coil unit 7A, the ring-shaped holding member 35, the second coil unit 7B, the spacer 6, the bearing 33, and the upper housing 21, which are disposed inside the upper housing 21, are held together with pressure in the axial and diametrical direction. For this reason, it is possible to prevent backlash between each of the members disposed in the upper housing 21 due to changes of a temperature.

As a result, in the torque sensor 1, the members have a certain distance with each other and have no backlash between the members, thereby maintaining high accuracy for detecting steering torque.

Because the torque sensor 1 is employed in the electric power steering apparatus 11 that applies assist steering force to a steering system of a vehicle, detection accuracy of steering torque can be improved by the torque sensor 1, and the electric power steering apparatus 11 can be provided with high performance, high reliability or the like.

MODIFIED EXAMPLE

It should be noted that the present invention is not limited to the above-mentioned embodiment, but various modifications or changes can be made within the scope of the technical idea of the invention. The present invention should include such modifications or changes.

Figure 7:
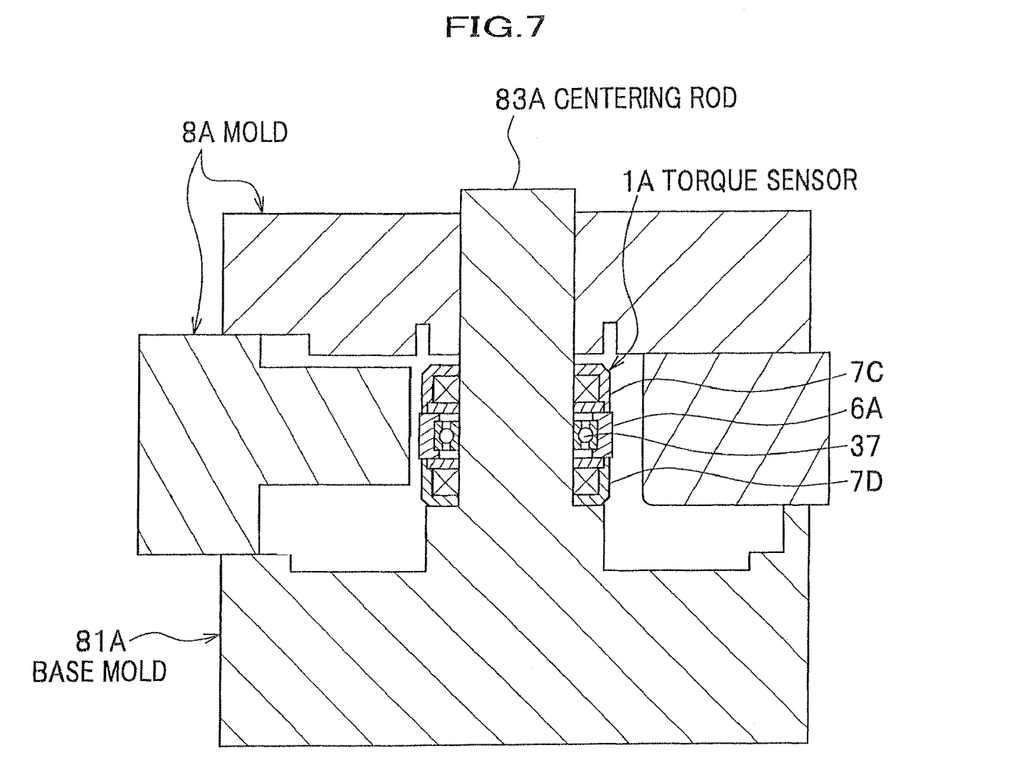
FIG. 7 illustrates a modified example of a torque sensor and a method of manufacturing a torque sensor according to an embodiment of the present invention, and explains the torque sensor in a molding process.
Figure 8:
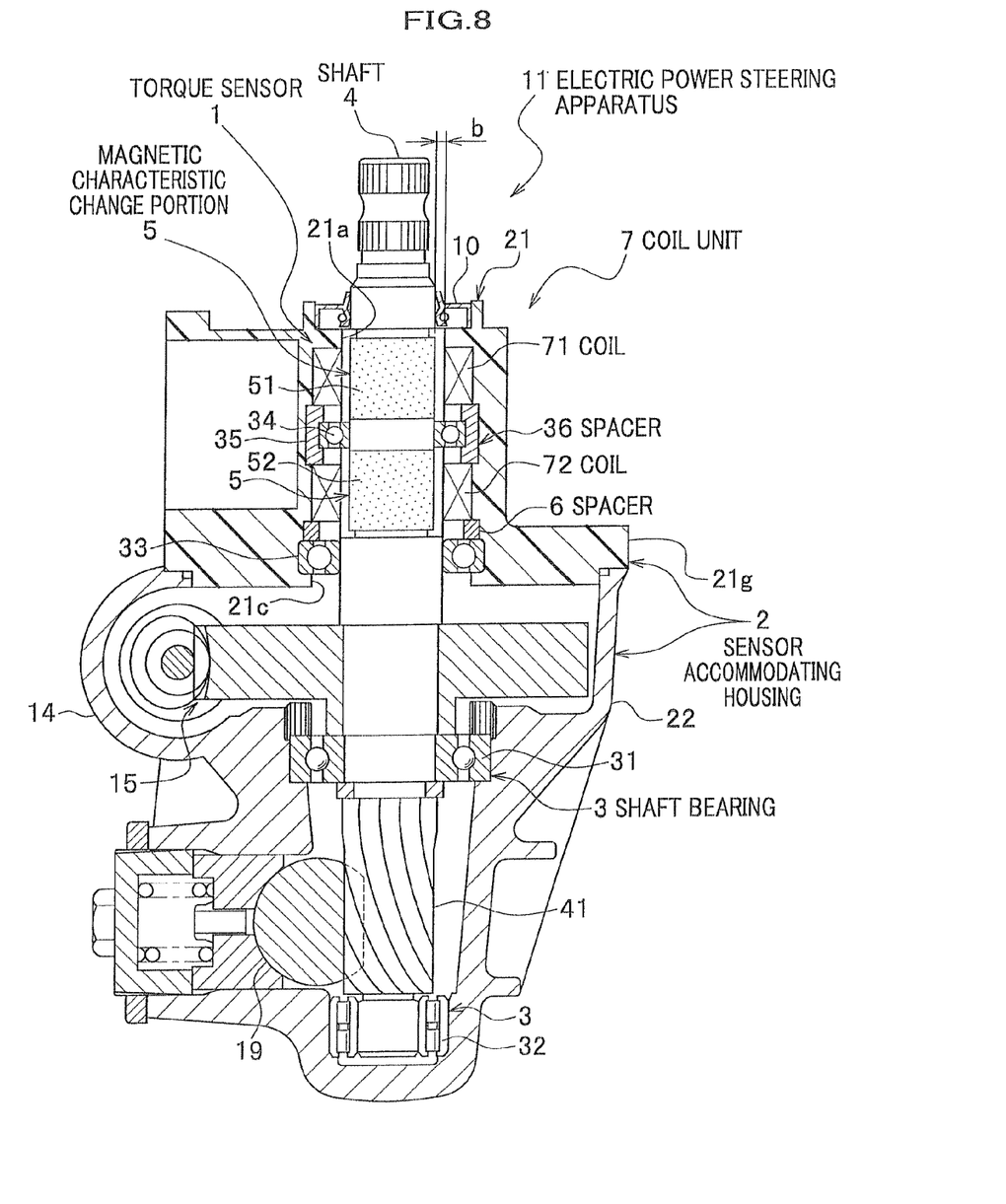
FIG. 8 illustrates the second modified example of a torque sensor and a method of manufacturing a torque sensor according to an embodiment of the present invention, and is a schematic sectional view of a main part of an electric power steering apparatus where a torque sensor is mounted.

With reference to FIGS. 7 and 8, a description will be given on modified examples of the present invention. In the modified examples, a description will be omitted for members that have the same function as that of the torque sensor 1 according to the above-mentioned embodiment shown in FIGS. 1 to 6.

First Modified Example

With reference to FIG. 7, the first modified example of the present invention will be described.

FIG. 7 illustrates the first modified example of a torque sensor and a method of manufacturing a torque sensor according to an embodiment of the present invention, and explains the torque sensor in a molding process.

The torque sensor 1 (see FIG. 2) of the above-described embodiment may have such a configuration that a spacer 6A including a relatively small-sized bearing 37 is interposed between a first coil unit 7C and a second coil unit 7D, as shown in a torque sensor 1A of the first modified example of FIG. 7.

As shown in FIG. 7, the torque sensor 1A may not include the spacer 6 or the bearing 33 (see FIG. 2) that are mentioned in the above-mentioned embodiment. It is, therefore, possible to downsize and simplify the torque sensor 1A.

Furthermore, the lower centering rod 82a and the upper centering rod 83 of the die 8, which are employed in the method of manufacturing the torque sensor 1 in the above embodiment as shown in FIG. 3, may have a configuration of a base die 81A of a die 8A in the modified example of FIG. 7. That is, a centering rod 83A may be integrally formed with the base die 81A.

With such a configuration, it is possible to further improve dimensional accuracy of the centering rod 83A because the centering rod 83A has no connections.

Second Modified Examples

FIG. 8 illustrates the second modified example of a torque sensor and a method of manufacturing a torque sensor according to an embodiment of the present invention, and is a schematic sectional view of a main part of an electric power steering apparatus where a torque sensor is mounted.

In FIG. 2, the first coil unit 7A and the second coil unit 7B include the coils 71, 72 and the yokes 73, 74. However, as shown in FIG. 8, the yokes 73, 74 may be removed as long as the coils 71, 72 are disposed.

With such a configuration, it is possible to reduce the number of the components by removing the yokes 73, 74, omit a part of the internal member disposing process (the first process) upon manufacturing the torque sensor, and simplify a configuration of the torque sensor. Although magnetic permeability decreases due to the removal of the yokes 73, 74, the first and second coil units can be used as a torque sensor.

In this case, the spacer 36 is interposed between the coil 71 and the coil 72, and the spacer 6 is interposed between the coil 72 and the bearing 33.

Other Modified Example

For example, each of the first coil unit 7A and the second coil unit 7B, which are shown in FIG. 2, may have an substantially E shape in a sectional view, and have a two layer structure where the two coils 71 and the two coils 72 are formed in the first coil unit 7A and the second coil unit 7B, respectively.

The spacer 6 shown in FIG. 2 may be an elastic member such as a plate spring, a disc spring, a spring washer, or a coil spring in order to bias the coil unit 7 contained in the sensor accommodating portion 21b, and prevent backlash between the members, space between the first coil unit 7A and the second coil unit 7B, or the like.

The above description has been given on the torque sensor 1 that is used in the electric power steering apparatus 11, which steers a vehicle by driving the motor 14 in accordance with steering torque, but the torque sensor 1 may be used for a torsion bar or other various apparatus.

What is claimed is:

1. A method of manufacturing a torque sensor comprising a magnetic characteristic change portion formed on a rotary shaft, a plurality of coil units having a substantially cylindrical shape, the plurality of coil units including first and second coil units, each including a detection coil arranged to face the magnetic characteristic change portion, the method using a centering rod and a die set including a base die and other dies, the method comprising the steps of:

fitting internal members including the first coil unit, the second coil unit, and a spacer on the centering rod to dispose the internal members on the base die, the centering rod including an upper centering rod which has on a lower side thereof a small diameter portion with a diameter which is smaller than the other portion of the upper centering rod and a lower centering rod;

fitting the second coil unit onto the lower centering rod;

fitting a bearing, which has an inner diameter that is smaller than the inner diameter of the first and second coil units, onto the small diameter portion of the upper centering rod and connecting the upper centering rod to the lower centering rod;

fitting the first coil unit onto the upper centering rod;

setting the other dies on the base die;

molding a resin, in which the first coil unit, the second coil unit, and the spacer are fixed; and disconnecting, after the molding, the upper centering rod from the lower centering rod to disassemble the base die, the other dies and the centering rod.

2. The method of manufacturing the torque sensor according to claim 1, wherein a yoke is disposed on an outer circumference of each of the plurality of detection coils.

3. The method according to claim 1, further comprising the steps of:

removing the base die, the other dies and the centering rod after molding the resin to obtain an upper housing; and fitting the upper housing in a lower housing on which the rotary shaft having the magnetic characteristic change portion is mounted.

4. The method according to claim 1, further comprising the steps of:

cooling off a die assembly that includes the base die, the other dies and the centering rod after molding the resin;

then removing the base die, the other dies and the centering rod to obtain an upper housing; and fitting the upper housing in a lower housing on which the rotary shaft having the magnetic characteristic change portion is mounted.

* * * * *